United States Patent [19]

Kinbara et al.

[11] 4,297,402
[45] Oct. 27, 1981

[54] PACKAGING BAG

[75] Inventors: Koichi Kinbara; Norimaro Sugimoto, both of Kawasaki; Toshitaka Nakazawa, Kure, all of Japan

[73] Assignees: Meito Co. Ltd.; Toyo Pulp Co. Ltd., both of Tokyo, Japan

[21] Appl. No.: 141,580

[22] Filed: Apr. 18, 1980

[30] Foreign Application Priority Data

Apr. 21, 1979 [JP] Japan .......................... 54-53536[U]
May 8, 1979 [JP] Japan .......................... 54-60911[U]

[51] Int. Cl.³ .................. B65D 33/02; B32B 3/30; B32B 5/12; B32B 7/04
[52] U.S. Cl. ........................... 428/35; 428/110; 428/161; 428/162; 428/172; 428/211; 428/247; 428/910
[58] Field of Search ............ 428/35, 110, 134, 161, 428/162, 172, 211, 247, 910; 229/55

[56] References Cited

U.S. PATENT DOCUMENTS

| 3,575,777 | 4/1971 | Allport | 428/172 |
| 3,746,607 | 7/1973 | Harmon et al. | 229/55 |
| 3,775,231 | 11/1973 | Thomas | 428/172 |
| 3,973,063 | 8/1976 | Clayton | 428/172 |
| 4,101,359 | 7/1978 | Failliot | 428/110 |
| 4,174,804 | 11/1979 | Bosse | 428/35 |

Primary Examiner—William J. Van Balen
Attorney, Agent, or Firm—Stevens, Davis, Miller & Mosher

[57] ABSTRACT

A packaging bag made by the use of a reinforced sheet in which non-woven cross-linked plastic sheets are inserted between cellulosic papers. The non-woven cross-linked sheet consists of split films with narrow width crossing each other laterally and longitudinally with slightly protruded intersections. The reinforced sheet is made by inserting the non-woven cross-linked sheets between cellulosic papers during paper making on a combination paper machine, thereby slightly protruded portions caused by the intersections in the non-woven sheets can be secured on the whole surface of the reinforced sheet. The bag thus manufactured using the reinforced sheet has extremely improved strength and handling properties as well as good air permeability compared with the conventional paper and plastic film bags.

5 Claims, 4 Drawing Figures

PACKAGING BAG

BACKGROUND OF THE INVENTION

This invention relates to a bag, and more particularly to a packaging bag used for containing essentially grain, cement, etc. with preferable mechanical strength and air permeability.

As a bag for packaging rice, grain or the like, there is employed a bag of synthetic resin sheet perforated with a number of fine pores on the entire surface instead of a burlap bag. Since the synthetic resin sheet of the bag incorporates high surface smoothness, the bags are dangerously apt to collapse when the bags filling contents are stacked, to slide down from holding arms when they are carried in the arms, and to gradually increase its small crack due to its internal pressure of the content if the bag is once scratched to cause the small crack and to fail to safely contain the content. Further, the fragment of the bag is inclined to break down at its initial handling time after filling content in the bag, and broken paper is mixed with the content to thereby contaminate the content and thus cause a problem.

SUMMARY OF THE INVENTION

This invention contemplates to provide a packaging bag fabricated by the use of reinforced sheet in which non-woven cross-linked plastic sheet are inserted between cellulosic papers during paper making on a combination paper machine.

The non-woven cross linked plastic sheet consists of flat yarns split from oriented plastic film or oriented plastic monofilament of 100–1,500 denier laterally and longitudinally aligned at an interval of 1 mm–30 mm and thermally welded or adhered at the respective intersections with an adhesive. The yarn or monofilament is made of material having high orientation strength such as polypropylene, polyethylene, polyvinyl alcohol, polyamide, polyvinylidene chloride, etc. The combination paper means in the specification a sheet fabricated by the steps of aligning a plurality of vats longitudinally along a paper making line and superimposing the webs made from the respective vats. The combination paper stuff generally employs kraft pulp, but may adopt bagasse, burlap, etc. as non-wood fibrous pulp instead of draft pulp or regenerated stuff such as outside sheets, waste paper, etc. to utilize effectively substitute resources.

Since the bag fabricated according to this invention employs the non-woven plastic sheet of perpendicularly crossed weft and warp yarns interposed integrally with and buried between cellulosic papers during paper making on a combination paper machine, the non-woven plastic sheet cannot be separated, and its wove gaps do not obstruct the air permeability of the combination paper layer. As the non-woven plastic sheet is not exposed outside the bag, there is no apprehension of generating static electricity adapted for smooth bag making work and powder filling work.

Inasmuch as a lattice-like rugged surface is formed at least on the whole surface of the body of the packaging bag according to this invention as buried with the non-woven plastic sheet inserted between the cellulose papers, the whole surface of the body of the bag becomes rough to thereby prevent both the collapse of the stacked bags, and the sliding of the bag from the holding arm ensuring the exact transportation of the bags.

Further, since the body of the bag according to this invention has no apprehension that a small scratch is gradually increased to cause its rupture when stress concentration is applied to the scratch by the weight of the content, such as occurs in the synthetic resin bag provided with air permeability by forcibly perforating pore group on the surface, but has air permeability with superior mechanical strength and is fabricated in the step of combination the reinforced sheet with the non-woven plastic sheet inserted between the cellulose papers to produce the sheet forming the body of the bag, it can simplify the manufacturing steps.

It will be appreciated that the bag of this invention may also be made by the use of a reinforced sheet in which the above non-woven plastic sheets are inserted between the cellulose papers as a single ply or as double plies using the same.

When this bag employs double plies, the inner ply is made by said reinforced sheet, and the outer ply is made of the reinforced sheet fabricated in the following manner. That is, the preferable outer ply includes a sheet made by laminating the non-woven plastic sheet on the kraft paper by means of polyethylene extrusion laminating process.

It will also be appreciated that the outer ply may be made by the sheet in which plastic film is laminated on one or both-side surfaces of kraft paper.

It is noted that in all cases a plastic layer is formed on the inner surface of the outer ply facing with the inner ply of the bag to thereby impart wetprootness to the bag.

It is, therefore, the principal object of this invention to provide a packaging bag which incorporates sufficient mechanical strength and air permeability.

Another object of this invention is to provide a packaging bag which can be stacked in numerous number and accommodates rough surface convenient for carrying it in the holding arm.

A further object of this invention is to provide a packaging bag which incorporates large evacuating capacity when filling powder such as cement or the like in the bag, complete moistureproof from the exterior, and sufficient strength against high pressure filling work.

Still another object of this invention is to provide a packaging bag which can eliminate a trouble of contamination of the fragments with the content due to rupture of the bag.

The novel features which are considered characteristic of the invention are set forth with particularity in the appended claims. The invention itself, however, and additional objects and advantages thereof will best be understood from the following description of embodiments thereof when read in connection with the accompanying drawings.

DESCRIPTION OF THE PREFERRED EMBODIMENTS

Figure 1:
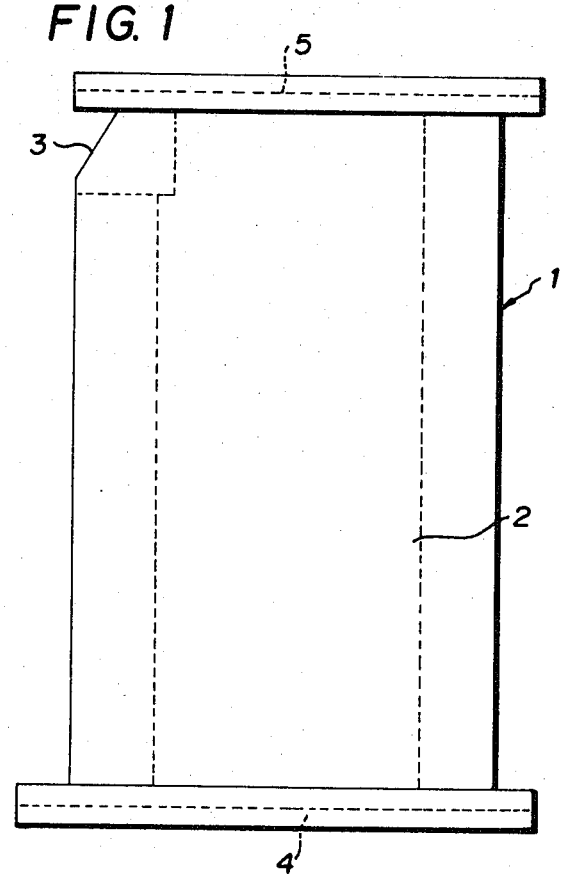
FIG. 1 is a front view of the packaging bag constructed according to this invention.

Referring to the drawings, particularly to FIG. 1 showing one preferred embodiment of the packaging bag constructed according to this invention, wherein like reference numerals designate the same parts in the following views, the bag 1 consists of a body 2, a filling inlet such as a sewn open mouth 3, and top and bottom seals 4 and 5. The body 2 is fabricated by a reinforced sheet in which non-woven cross-linked plastic sheets are inserted between the cellulose papers 6 and 7 such as reinforced wetproof sheet of combination paper as illustrated more clearly in FIG. 2. The non-woven plastic sheet 8 consists, for example, of films 9a, 9b split from an oriented polypropylene film, with narrow width crossing each other with slightly protruded intersections 10. The sheet is protruded at the intersections 10 of the laterally and longitudinally films 9a, 9b of the non-woven plastic sheet 8 inserted between the upper and the lower cellulose papers 6 and 7 on the entire front and back surfaces thereof to form slightly protruded portions 11 thereat, and recessed at the narrow width 12 among the films 9a, 9b of the non-woven plastic sheets 8 on the entire front and back surfaces thereof to form recess portions 13 thereat. Since no films 9a, 9b are present at the recess portions 13 of the sheet, the sheet can retain high air permeability in the same manner as the ordinary kraft paper bag.

The bag manufactured by the sheet thus fabricated exhibits high mechanical strength by the non-woven plastic sheet inserted between the cellulose papers.

It should be appreciated that since the non-woven plastic sheets of split films with narrow width crossing each other and longitudinally with slightly protruded intersections inserted between the combination cellulose papers the surface of the sheet of the bag becomes rough to thereby prevent the collapse of the stacked bags and the sliding of the bag from the holding arm at its transporting time for safely handling the bags.

Figure 3:
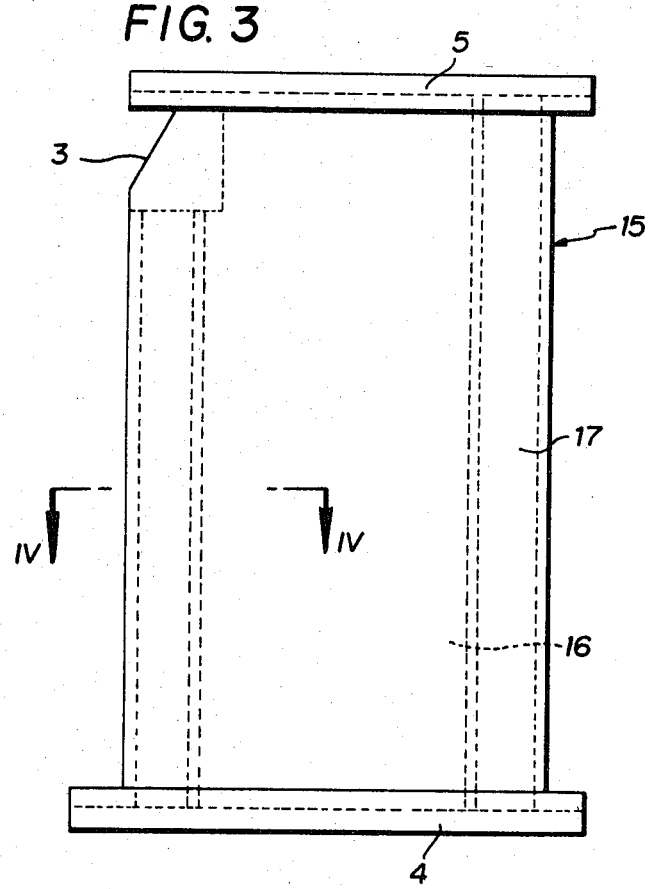
FIG. 3 is a front view of the packaging bag of another embodiment of this invention employing a reinforced good air permeable sheet bag as an inner ply and a reinforced wet proof sheet bag as an outer ply in a double bag.
Figure 4:
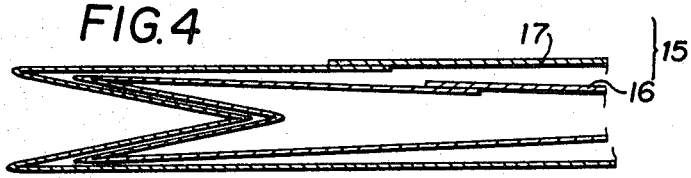
FIG. 4 is an enlarged sectional view of the bag taken along the line IV—IV in FIG. 3.

FIGS. 3 and 4 show another preferred embodiment of the bag constructed according to this invention wherein the bag 15 consists of outer and inner plies.

Figure 2:
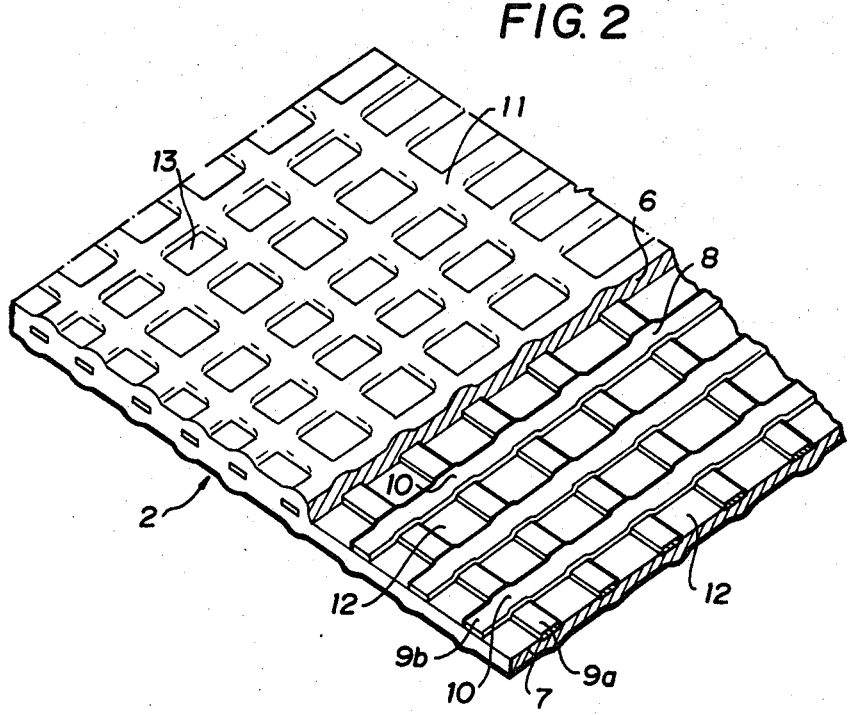
FIG. 2 is a perspective view fragmentarily enlarged of the reinforced sheet for forming the bag of this invention.

The inner ply 16 of this bag 15 is fabricated by the reinforced sheet in which non-woven plastic sheets of split films with narrow width inserted between the cellulose papers in the same manner as shown in FIG. 2.

The outer ply 17 of this bag 15 is made by the use of a reinforced sheet in which the above non-woven plastic sheet is laminated on kraft paper by means of an extrusion laminating process of thermoplastic such as polyethylene.

The bag 15 depicted in FIG. 3 is reinforced with non-woven plastic sheet inserted between the cellulose papers at its inner ply 16 to retain its air permeability at the recess portions 13 corresponding to the wove gaps 12 thereof and to prevent the close contact with the outer ply 17 via the rough surface produced by the recess and raised portions 13, 11 of the inner ply 16 to thereby communicate the spaces in the recess portions 13 through the gap between the inner ply and the outer ply with the outer atmospheric air.

Accordingly, it can produce air evacuating capacity necessary for filling cement, grain, etc. under high pressure in the bag.

When 50 kg of cement was filled in this two-ply bag and the bag thus filled was dropped in horizontal state from the height of 1.2 m as a drop test, it could endure without rupture over 40 repetitions on this drop test. Test results of the comparison between the conventional bag and this invention bag are listed in the following Table.

TABLE

|  |  | Bag material | Tensile strength | Tearing strength |
|---|---|---|---|---|
| Conventional bag |  | Kraft 75g/m² Upper & Lower kraft layers 80g/m² | 16kg/5cm width | 100g |
| This invention bag | Inner ply | Non-woven sheet 20g/m² Total:100g/m² | 25kg/5cm width | 1000g |
|  | Outer ply | Kraft paper 75g/m² polyethylene lamination 15g/m² Non-woven sheet 40g/m² Total:130g/m² | 40kg/5cm width | 1200g |

Note:
In the above Table, the values in the tensile and tear tests were obtained by the arithmetic means of both the lateral and longitudinal test results.

It is noted that when the reinforced sheet is fabricated, the front or back combination cellulose papers are removed in predetermined width from both ends of the sheet to thus expose the non-woven plastic sheet at the portions and when the bag is manufactured, the exposed portions are rigidly adhered with adhesive.

What is claimed is:

1. A packaging bag fabricated by a reinforced sheet in which a non-woven cross-linked plastic sheet of split films with narrow width crossing each other is inserted between combination cellulose papers in a manner that the intersections of the split films of the non-woven plastic sheet are presented at least on one side surface of the sheet in protruded pattern.

2. A packaging bag according to claim 1, wherein the plastic yarns are split from an oriented film comprising at least one substance selected from the group consisting of polyethylene, polypropylene, polyvinyl alcohol, polyamide and polyvinylidene chloride.

3. A packaging bag according to claim 1, wherein said non-woven plastic sheet consists of split films with narrow width crossing each other laterally and longitudinally with slightly protruded intersections adhered thermally or with adhesive.

4. A packaging bag comprising inner and outer plies, wherein said inner ply is fabricated by a reinforced sheet in which a non-woven cross-linked plastic sheet of split films with narrow width crossing each other is inserted between combination cellulose papers, and said outer ply is fabricated by kraft paper having a plastic layer at least on the inner surface thereof.

5. A packaging bag comprising inner and outer plies, wherein said inner ply is fabricated by a reinforced sheet in which a non-woven cross-linked plastic sheet of split films with narrow width crossing each other is inserted between combination cellulose papers in a manner that the intersections of split films of the non-woven plastic sheet are protruded to form a protruded pattern on the outer surface of the sheet as a rough surface, and said outer ply is made by a reinforced sheet in which said non-woven cross-linked plastic sheet is laminated on kraft paper by means of an extrusion laminating process of thermoplastic.

* * * * *